United States Patent [19]

Dixon et al.

[11] 4,198,060
[45] Apr. 15, 1980

[54] WIPING APPARATUS AND METHOD FOR A HIGH-DENSITY INFORMATION RECORD

[75] Inventors: Frederick L. Dixon, Trenton; Leonard P. Fox, Cherry Hill; Edward G. Trachman, Princeton, all of N.J.

[73] Assignee: RCA Corporation, New York, N.Y.

[21] Appl. No.: 748,009

[22] Filed: Dec. 6, 1976

[51] Int. Cl.² ............................................. G11B 3/58
[52] U.S. Cl. ..................................................... 274/47
[58] Field of Search ........................................ 274/47

[56] References Cited

U.S. PATENT DOCUMENTS

| 1,404,147 | 1/1922 | Runk | 274/47 |
| 3,822,065 | 7/1974 | Arbib | 274/47 |
| 3,992,018 | 11/1976 | Plummer et al. | 274/47 |

FOREIGN PATENT DOCUMENTS

| 24055 | 2/1919 | Denmark | 274/47 |
| 1198582 | 8/1965 | Fed. Rep. of Germany | 274/47 |

*Primary Examiner*—Harry N. Haroian
*Attorney, Agent, or Firm*—E. M. Whitacre; J. S. Tripoli

[57] ABSTRACT

A pad for wiping the surface of a high-density information disc wherein information is recorded in a groove on the surface of the disc, comprises a plurality of fibers, projecting from a backing element and having ridged outer surfaces. The diameter of each of the fibers is greater than the width of the groove, while the width of at least some of the ridges is narrower than the width of the groove. One wiping method involves manually bringing the pad's fibers into contact with the grooved surface of the disc while establishing relative motion therebetween. In an alternative method, the wiping function is automatically implemented in a disc player by means mounted on the player lid for bringing the pad's fibers into and out of contact with the grooved surface of a disc carried by a rotating turntable, responsively to the travel of a signal pickup carriage.

8 Claims, 11 Drawing Figures

WIPING APPARATUS AND METHOD FOR A HIGH-DENSITY INFORMATION RECORD

The present invention relates generally to apparatus and methods for wiping a finely grooved surface, and more particularly relates to such apparatus and methods for wiping the grooved surfaces of information records.

In certain sophisticated information recording and playback systems, information is recorded in the bottom of a smooth spiral groove on the surface of a recording medium. High information packing densities in such systems are achieved by having groove densities in the order of four to eight thousand groove convolutions per inch.

One example of such a system is described in detail in U.S. Pat. No. 3,842,194, issued on Oct. 15, 1974, to Jon K. Clemens. Illustratively, the Clemens system employs a disc-shaped recording medium having video and audio information recorded by means of geometric variations in the bottom of a smooth spiral groove on the surface thereof, the groove being coated with a metal layer overlaid by a dielectric layer. Information is recovered from the bottom of the groove by means of a signal pickup electrode, supported at one end of a pickup arm which engages the spiral groove. As relative motion is established between the disc and the signal pickup electrode, an electrode-disc capacitance varies in response to the geometric variations in the bottom of the spiral groove passing beneath the signal pickup electrode. The capacitance variations are converted to electrical signal variations by a suitable signal processing circuitry coupled to the pickup electrode.

One problem associated with the operation of an information recording and playback system of the above-described type to recover the recorded information is the presence of dust particles and debris in various regions of the disc groove. The signal pickup encounters with such dust and debris often result in the deflection of the signal pickup out of engagement with the bottom of the groove leading to momentary distress or loss of information signals. More severe encounters may result in the signal pickup skipping several groove convolutions at a time leading to the loss of a plurality of frames of video information. Dust and debris particles in groove regions may also be responsible for locked groove incidents with the signal pickup retracing the same path over and over. Furthermore, these encounters may result in rapid wear for the disc and the signal pickup (e.g., as the signal pickup lands on the rotating disc surface after being deflected).

In accordance with the principles of the present invention, partial alleviation of the problem produced by the dust and debris particles may be had by wiping the surface of the information record, prior to the playback thereof, with a fabric having a pile surface of a type where the individual pile fibers have ridged outer surfaces, and where the diameter of each of the fibers is chosen to be greater than the width of the disc groove to impart stiffness to the fibers, while the width of at least some of the ridges is chosen to be narrower than the width of the groove to permit ridge penetration of the groove.

In accordance with an illustrative embodiment of the present invention, a backing element is processed so as to form on one side a flat surface, which is then covered by a velvet material so that the velvet pile will outwardly project. Illustratively, such a velvet material may be Cheney #2106 rayon velvet, which is commercially available from the Cheney Brothers Company of Manchester, Connecticut. The backing element and the velvet material form a wiping pad which may include handle means attached to the other side of the backing element.

The wiping pad, formed in the above-described manner, constitutes an apparatus which may be utilized to alleviate dust and debris particle induced problems in high-density information records.

In an illustrative method embodying the principles of the present invention, the pile surface of a wiping pad of the above-described formation is manually brought into contact with the grooved surface of a rotating high-density information record. As the record is rotated, some of the ridges of the projecting fibers engage and track portions of the information groove. This tracking motion is apparently sufficient to dislodge many of the dust and debris particles in such a manner that they no longer present the same impediment to signal pickup operations that they did prior to wiping.

In accordance with another illustrative embodiment of the present invention, the wiping pad may be pre-soaked with a suitable lubricant material.

Pursuant to yet another aspect of the present invention, the ends of the projecting fibers may be slanted with respect to the longitudinal dimension of the individual fibers, thereby enhancing the ability of the ridges to engage the smooth groove.

In accordance with yet another illustrative embodiment of the present invention, the wiping of high-density information records may be accomplished by automatic means incorporated in an information record playback apparatus, which may be actuated responsively to the operation of the playback apparatus.

The use of velvet type materials to wipe disc records is well known in the prior art dealing with phonograph discs (e.g., U.S. Pat. No. 3,485,502 to Thornton, and U.S. Pat. No. 1,404,147 to Runk). However, in such prior art uses, adequate groove penetration by wiping material is readily achieved with independence of the cross-sectional shape of individual fibers, since the groove width in phonograph discs is greater than the diameter of the individual fibers of a variety of wiping materials.

Figure 1:
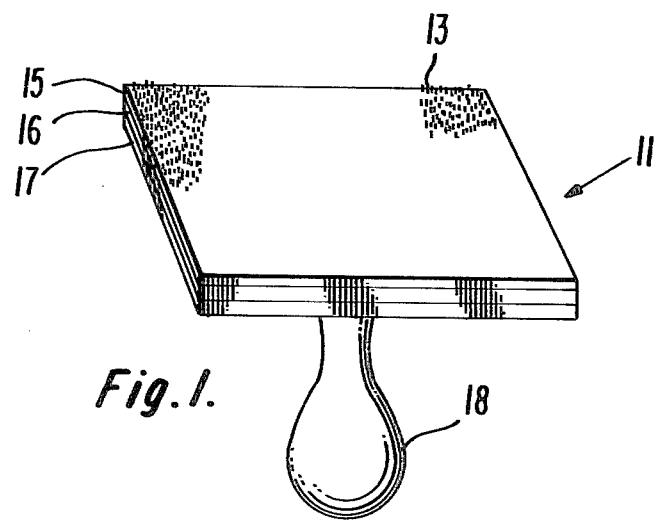
FIG. 1 is a perspective view of a wiping pad in accordance with an embodiment of the present invention.

In FIG. 1, the wiping pad 11 comprises a velvet type fabric having a pile formed of a plurality of fibers 13 projecting from one side of a web 15. The web 15 is attached, on the other side thereof, to a backing element 16, such as a soft rubber pad, which is in turn attached to one side of a stiff plate 17. A handle 18 is attached to the other side of the stiff plate 17. The backing element 16 and stiff plate 17 are both of substantially uniform thickness so that when the pile surface of the wiping pad 11 is held against a flat surface and pressure is applied to handle 18 to press the wiping pad 11 against the flat surface, the pressure will be evenly distributed along the entire pile surface of wiping pad 11.

Illustratively, wiping pad 11 is rectangular in shape, having a length which is slightly greater than the radial length of the recorded surface of an information record disc in accordance with the aforementioned Clemens patent. It will be appreciated, however, that other shapes and dimensions for the wiping pad are equally suitable for use with the information record disc.

Figure 2:
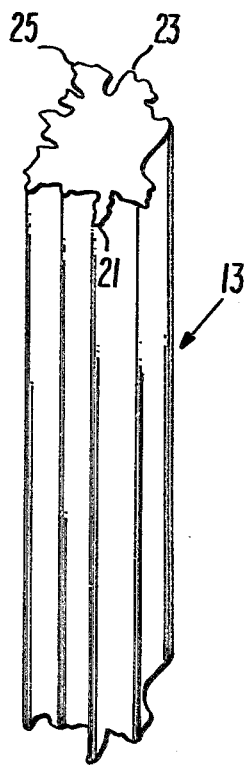
FIG. 2 is an enlarged frontal view of a diagonal end of a fiber forming part of the pile of the wiping pad of FIG. 1.
Figure 3:
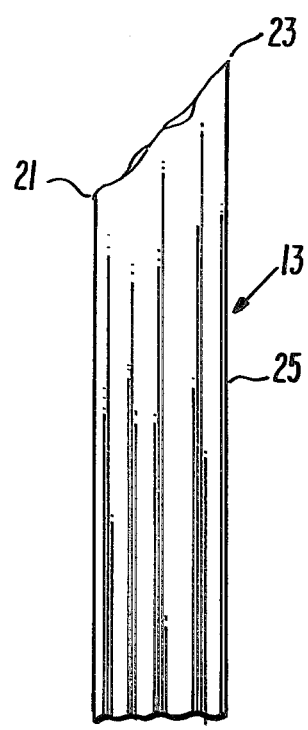
FIG. 3 is an enlarged side view of the fiber illustrated in FIG. 2.
Figure 4:
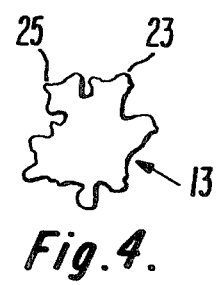
FIG. 4 is an enlarged cross-sectional view of the fiber illustrated in FIG. 2.

To more clearly bring out the nature of the ridged outer surfaces of the individual fibers 13 forming the pile of the FIG. 1 pad, reference may be made to FIGS. 2, 3 and 4 which show several views of an enlarged tip portion of one of the fibers 13. It will be observed in FIG. 2 that the outer surfaces of the fiber 13 are longitudinally ridged such as at 21, 23 and 25, and that the shape and therefore the width of any one ridge varies considerably from one ridge to another. FIG. 3 shows a side view of the tip portion of fiber 13 which has been diagonally cut. It is believed that the diagonal cut enhances the ability of the ridges, around the periphery of the diagonal cut, to project into the disc groove.

FIG. 4 shows a cross-section of fiber 13 to illustrate the dimensional relationship between the diameter of the fiber 13 and ridges 21, 23 and 25 wherein it will be observed that at least some of the ridges are narrower than 1/6th the diameter of the fiber 13. As will be discussed in more detail hereinafter, this dimensional relationship is believed to play an important part in eliminating the aforementioned problems encountered during video disc playback.

Figure 5:
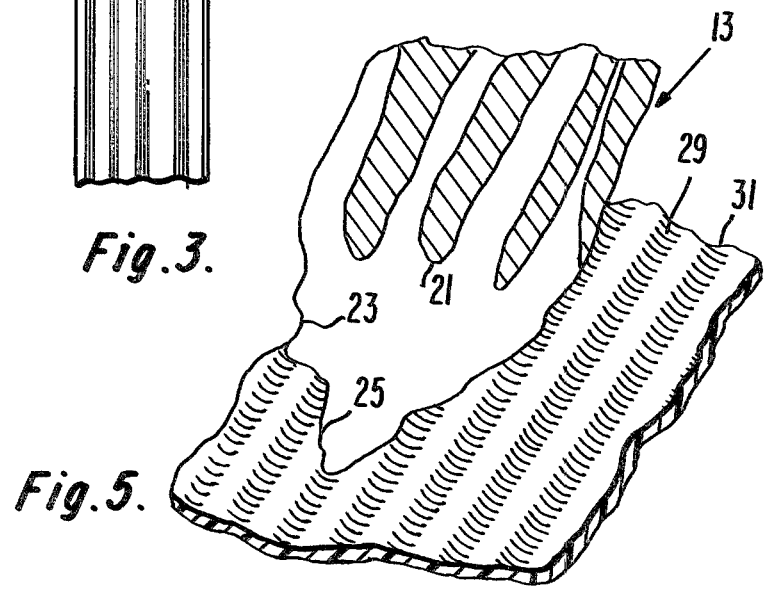
FIG. 5 is an enlarged sectional detail illustrating a fiber forming part of the pile of wiping pad of FIG. 1, having a ridge which is "tracking" a groove in a video disc.

With reference to FIGS. 1 and 5, disc wiping can be carried out in a variety of ways. One simple way is to press the pile surface of wiping pad 11 against the recorded surface of a disc while the disc is revolving (e.g., at a speed of approximately 400–500 RPM) on a turntable. For purposes of illustration, the pressing force applied to handle 18 is such to provide a 10 gms/cm$^2$ pressing force along the interface between the video disc recorded surface and the pile surface for approximately 5 seconds.

FIG. 5 illustrates the interrelationship between the tip portion of fiber 19 and the groove 29 of a high-density information disc 31 (only a portion of which is shown) which may, for example, be a video disc in accordance with the aforementioned Clemens patent, the width of groove 29 being of the order of 3.5 microns. Ridge 25 of a fiber 13 is illustratively shown in FIG. 5 as being sufficiently narrow for entry within the groove 29, and engagement with the groove bottom. The relatively large diameter of the fiber 19 (e.g., 20 microns) with respect to the groove width is believed to impart stiffness to the fiber 13, enhancing the likelihood of dislodging of debris as the ridges thereof engage dust or debris particles in the groove.

The wiping pad may be pre-soaked with a suitable lubricant.

Video disc wiping may also be implemented by more complex means which may be mounted to and form a part of a video disc player. Such means may, for example, be manually actuated by an operator of the disc player or may be completely automatic.

Figure 6:
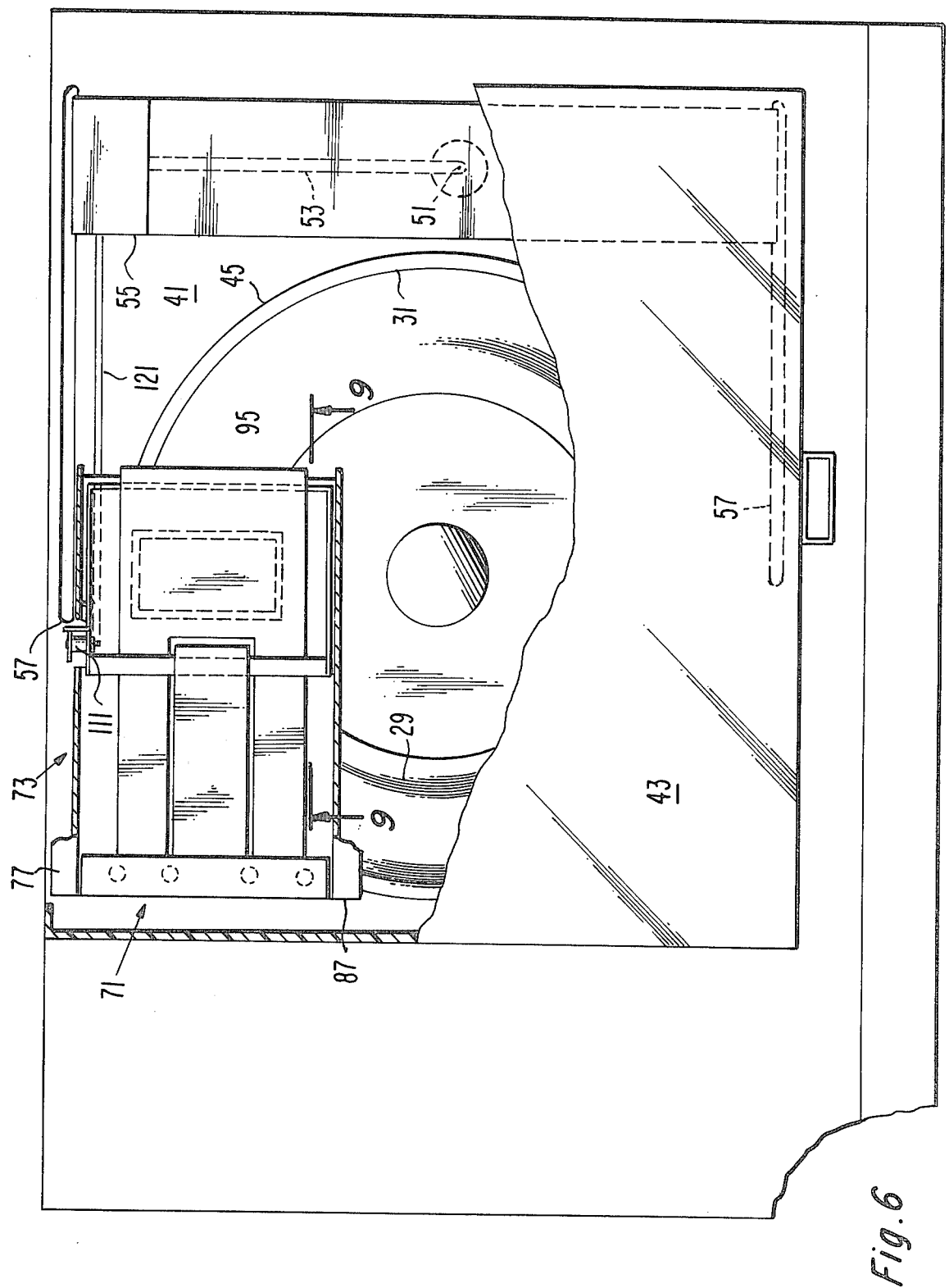
FIG. 6 is a plan view of a video disc record play incorporating an illustrative embodiment of a disc wiping mechanism according to the present invention, the lid of the player being partly broken away for clarity.

An automatic wiping apparatus can be made to operate responsively to the operation of the video disc player. For example, such a wiping apparatus could be actuated by electrical servo-mechanisms to press, at a prescribed pressure, a wiping pad in accordance with the present invention against the recorded surface of a high-density information disc carried by the turntable. While the automatic wiping apparatus could be actuated upon the detection of a variety of electrical signals generated during player operation, e.g., current flow to turntable motor, alternatively advantage may be taken of mechanical movements which are already available in the Clemens player system. Such an automatic system is illustrated in FIG. 6, and is described in detail in the copending U.S. patent application of Larry D. Huff, entitled, "AUTOMATIC DISC WIPING APPARATUS" and filed concurrently herewith.

The system of FIG. 6 illustrates a video disc player, in accordance with the disclosure of the aforementioned Clemens patent, having a base 41 and a lid 43 pivoted to the base 41 for movement between a closed position and an open position. A turntable 45, rotatably mounted on the base 41, is adapted to support the video disc record 31 having a groove 29 on a major surface thereof.

A signal pickup 15 supported at one end of a conductive pickup arm 53 engages the spiral groove 29 during disc playback; the other end of the pickup arm 53 is flexibly supported by a pickup arm support carried by a signal pickup carriage 55. A radial feed drive mechanism (not shown) traverses the signal pickup carriage 55 in proper time relationship with the radial (with respect to the center of the disc) motion of the signal pickup 51 tip when engaged in the spiral groove 29 so as to continuously maintain the longitudinal axis of the pickup arm 53 substantially tangential to the spiral groove at the point of engagement. Slots 57 are provided in the base 41 for accommodating the lateral motion of the carriage 55. Illustratively, the feed drive mechanism includes a first drive means for moving the signal pickup carriage 55 between a standby position and playback positions and a second drive means for moving the signal pickup carriage during the playback of the disc 31. Reference may be had to U.S. Pat. No. 3,870,835 to Stave for an illustration of a suitable feed drive mechanism for providing the indicated lateral motion of the signal pickup carriage 55.

Figure 8:
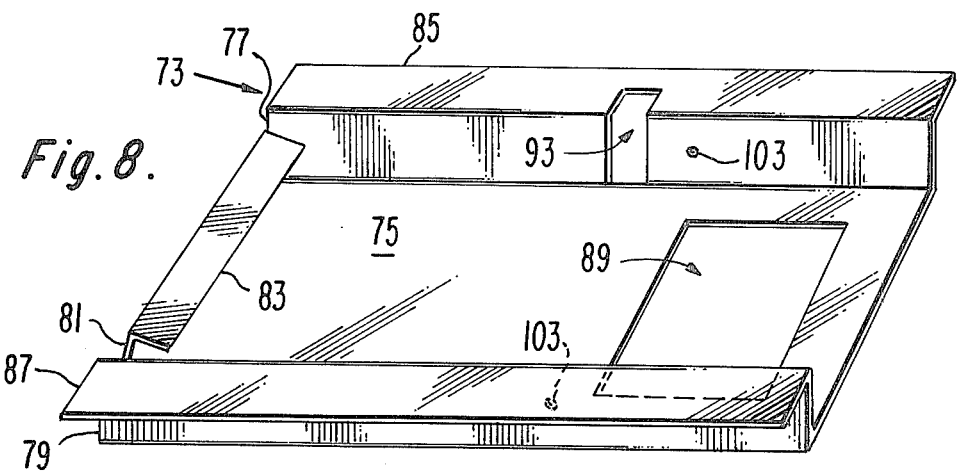
FIG. 8 is a perspective view of a housing support for the wiping mechanism of FIG. 6.

A wiping apparatus 71 in accordance with an illustrative embodiment of the present invention is shown mounted to the underside of lid 43. As more clearly shown in the view of FIG. 8, a housing support 73, for the wiping apparatus, is in the form of a box having a rectangular base 75 and two parallel side walls 77 and 79 along respective lengths of the base 75. A third side wall 81, shorter in height than sidewalls 77 and 79, is disposed along a width of the base 75 and is provided with an angularly disposed flange 83. Sidewalls 77 and 79 are provided with respective flanges 85 and 87 which may be attached to the underside of lid 43 in any suitable manner to secure the housing support 73 to the lid.

Base 75 and sidewall 77 are respectively provided with apertures 89 and 91, the location and function of which will be further explained below.

Figure 7:
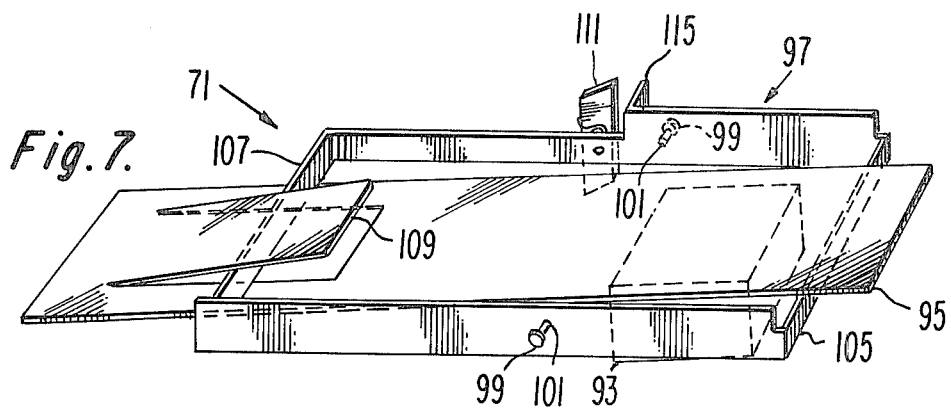
FIG. 7 is a perspective view of the wiping mechanism shown in FIG. 6.

As shown in FIG. 7, the wiping apparatus 71 includes a pad 93 in accordance with an embodiment of the present invention supported on a free end of an elongated leaf spring 95. As illustrated in FIG. 6, the other end of the leaf spring 95 is attached to the flange 83 such that the wiping pad 93 will project out of base aperture 89. With reference to FIG. 7, a mechanism for retracting the pad 93 into housing support 73 comprises a rigid frame 97 movably mounted to the housing support 73 for pivoting about an axis which is laterally disposed with respect to the leaf spring 95. The frame 97 is pivotally mounted to the housing support 73 by means of two pins 99 projecting through holes 101 and 103 in frame 97 and in sidewalls 77 and 79 respectively. A first member 105 of the rigid frame 97 is disposed to support the free end of the leaf spring 95 in a raised state responsively to the spring force of a cut-out tongue portion 109 centrally and longitudinally extending from the attached one end of the leaf spring acting on a second member 107 of the rigid frame. With the free end of the leaf spring 95 supported in the raised state, pad 93 is precluded from contacting the surface of disc 17.

A one-way trip pawl 111, pivotally mounted to the rigid frame 97 near the second member 107, and projecting through housing support aperture 91 is urged into engagement with a stop shoulder 115 provided on the rigid frame 97.

In FIG. 6, the housing support 73 is shown secured to the underside of lid 43 in such a manner that when the lid is in the closed position the pad 93, when projected through base aperture 89 under the spring force of leaf spring 95, will be in contact with groove 29 of disc 31. Pawl 111 cooperates with a raised portion 119 of an actuating arm 121 attached to the signal pickup carriage, pawl 111 being disposed in the path of the actuating arm 121 as it moves during travel of the signal pickup carriage 55.

Figure 9A:
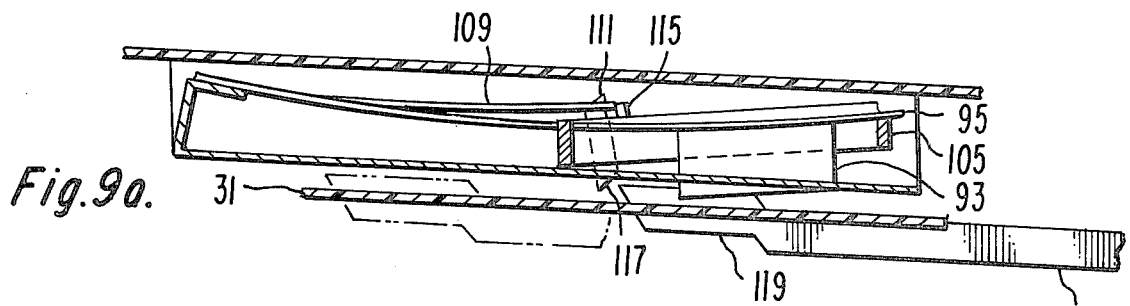
FIGS. 9a, 9b and 9c are partially cut-away sectioned side views of the wiping mechanism, along the line 9—9 in FIG. 6, at different instances during one cycle of operation thereof.

It will now be appropriate to discuss the actual operation of the wiping apparatus 71 and the cooperative relationship among the different elements thereof during one cycle of operation. With reference to FIG. 9a, the solid line representation of the actuating arm 121 is at the position where the signal pickup carriage 55 (not shown) is in the standby position. The raised portion 119 is positioned in the same vertical plane as pawl 111 and adjacent thereto and as the signal pickup carriage travels from the standby position to the playback position actuating arm 121 will travel (from right to left in FIG. 9a) therewith coming into contact with a slanted surface 117 of pawl 111.

Figure 9B:
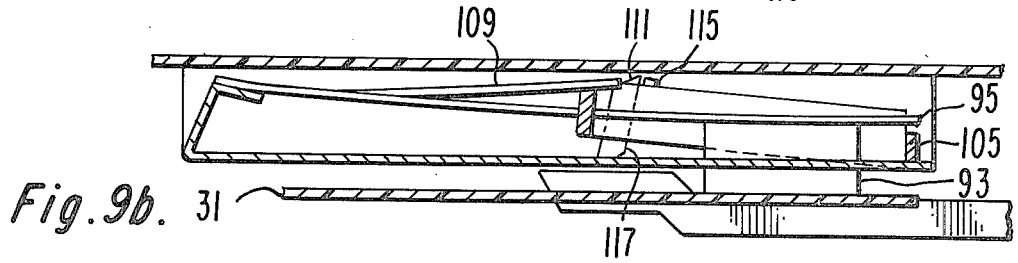

In FIG. 9b the front edge of raised portion 119 is shown contacting slanted surface 117 of pawl 111 thereby imparting a pivoting motion thereto towards stop shoulder 115. However, this pivoting motion will be resisted by stop shoulder 115 forcing pawl 111 to ride over the raised portion 119 resulting in a pivoting motion, against the spring force of tongue portion 109, being imparted to the rigid frame 97. The pivoting of frame 97 lowers first member 105, from its support position for the free end of leaf spring 95, allowing the pad 93 to come into contact with the surface of disc 31 solely under the force of leaf spring 95. As the signal pickup carriage 55 progresses towards a playback position, the raised end portion (shown in dashed line of FIG. 9a) will clear pawl 111 permitting the spring force of cut-out tongue portion 109 to pivot frame 97 back into the position where frame member 105 is supporting leaf spring 95 in a raised state, therefore retracting pad 93 into the housing support 73 and out of contact with the surface of disc 31.

Figure 9C:
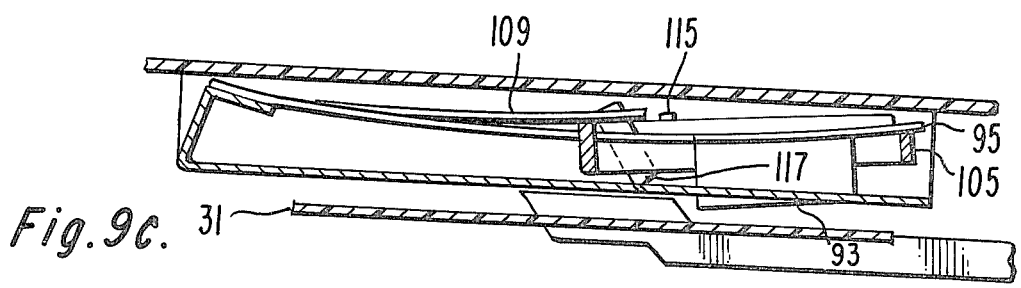

On the return travel of the signal pickup carriage 55 from a playback position to the standby position, illustrated in FIG. 9c, the rear edge of raised portion 119 will contact pawl 111 and a pivoting motion, away from stop shoulder 115, will be imparted to pawl 111. Since that pivoting motion is in a direction away from stop shoulder 115, pawl 111 will freely pivot as it rides over the raised portion 119 and no motion will be transmitted to the rigid frame 97.

What is claimed is:

1. In a playback system for recovering signal information represented on a grooved surface of a disc record by means of geometric variations in the bottom of a spiral groove having a given width; an apparatus comprising:
   (a) a wiping pad comprising:
      a backing element; and
      a plurality of fibers projecting from said backing element and having ridged outer surfaces, the diameter of each of said fibers being greater than said given width and the width of at least some of the ridges on each of said fibers being narrower than said given width;
   (b) a rotatable turntable havng a disc record supporting surface;
   (c) means for causing rotation of said turntable; and
   (d) means, coupled to said wiping pad and responsive to the operation of said playback system, for causing contact between said fibers and a grooved surface of a disc supported on said turntable surface during rotation of said turntable.

2. Apparatus in accordance with claim 1, for use with a disc having a groove width of the order of 3.5 microns, wherein:
   said fibers are longitudinally ridged and have a diameter in the order of 20 microns.

3. Apparatus in accordance with claim 2, wherein the width of at least some of the ridges of said fibers is less than 3.5 microns.

4. Apparatus in accordance with claim 1 wherein said fibers are formed of a rayon material.

5. Apparatus in accordance with claim 1 wherein said backing element is of uniform thickness.

6. Apparatus in accordance with claim 4 wherein said fibers are of substantially uniform height.

7. Apparatus in accordance with claim 5 wherein at least some of said fibers have end surfaces which are disposed at an angle with respect to said backing element.

8. A method for wiping the grooved surface of a disc record having signal information represented by means of geometric variations in the bottom of a spiral groove having a given width; comprising the steps of:
   contacting said grooved surface with a plurality of elongated fibers, of a diameter greater than said given width and having a plurality of longitudinal ridges on the respective outer surfaces thereof; and
   causing penetration of the groove, in a plurality of convolutions of said spiral, by some of the surface ridges of said fibers, to the exclusion of whole fiber penetration of the groove;
   while establishing relative motion between said grooved surface and said fibers.

* * * * *